US012692388B2

(12) United States Patent
Yi et al.

(10) Patent No.: US 12,692,388 B2
(45) Date of Patent: Jul. 28, 2026

(54) THERMOPLASTIC RESIN COMPOSITION FOR HIGH-BRIGHTNESS UNPAINTED METALLIC MATERIAL AND A MOLDED ARTICLE INCLUDING THE SAME

(71) Applicants: Hyundai Motor Company, Seoul (KR); Kia Corporation, Seoul (KR); Samyang Corporation, Seoul (KR)

(72) Inventors: Seul Yi, Seoul (KR); Boo Youn An, Hwaseong (KR); Dae Sik Kim, Yongin (KR); Kyeong Hoon Jang, Seoul (KR); In Soo Han, Uiwang (KR); Jin Gi Ahn, Seoul (KR); Jung Kyu Han, Sejong (KR); Suk Woo Kang, Wonju (KR); Do Young Bae, Daejeon (KR); Tae Jin An, Seoul (KR)

(73) Assignees: Hyundai Motor Company, Seoul (KR); Kia Corporation, Seoul (KR); Samyang Corporation, Seoul (KR)

( * ) Notice: Subject to any disclaimer, the term of this patent is extended or adjusted under 35 U.S.C. 154(b) by 638 days.

(21) Appl. No.: 17/958,581

(22) Filed: Oct. 3, 2022

(65) Prior Publication Data

US 2023/0112893 A1 Apr. 13, 2023

(30) Foreign Application Priority Data

Oct. 8, 2021 (KR) ........................ 10-2021-0133589

(51) Int. Cl.
*C08L 69/00* (2006.01)

(52) U.S. Cl.
CPC ......... *C08L 69/00* (2013.01); *C08L 2205/035* (2013.01)

(58) Field of Classification Search
CPC combination set(s) only.
See application file for complete search history.

(56) References Cited

U.S. PATENT DOCUMENTS

| | | | |
|---|---|---|---|
| 8,691,138 B2 | 4/2014 | Kang et al. | |
| 2014/0221547 A1 | 8/2014 | Kim et al. | |
| 2018/0066134 A1* | 3/2018 | Aoki | C08K 9/04 |
| 2018/0273749 A1* | 9/2018 | Shindo | C08F 212/10 |
| 2021/0070984 A1 | 3/2021 | Kim et al. | |

FOREIGN PATENT DOCUMENTS

| | | | |
|---|---|---|---|
| EP | 1 770 126 | * | 1/2018 |
| JP | 3470736 | B2 | 11/2003 |
| JP | 2009-001619 | A | 1/2009 |
| JP | 2013-139516 | A | 7/2013 |
| JP | 2013-139518 | A | 7/2013 |
| KR | 20170020129 | * | 2/2017 |
| KR | 2017-0095038 | A | 8/2017 |
| KR | 2019-0035571 | A | 4/2019 |
| WO | 2020-091279 | A1 | 5/2020 |

OTHER PUBLICATIONS

Machine translation of KR20170020129 (Year: 2017).*

* cited by examiner

*Primary Examiner* — Robert T Butcher
(74) *Attorney, Agent, or Firm* — Fox Rothschild LLP

(57) ABSTRACT

Disclosed are a thermoplastic resin composition for a high-brightness unpainted metallic material that has an excellent impact strength, chemical resistance, and heat resistance and exhibits an excellent metallic texture, and a molded article including the same.
The thermoplastic resin composition suitably includes a polycarbonate resin; a first copolymer; a polyester resin; a copolymer having a core-shell structure and having, as a core, one or more rubber polymers selected from the group consisting of a diene-based rubber polymer, an acrylic rubber polymer, and a silicone-based rubber polymer; a heat resistant component including one or more selected from the group consisting of N-phenyl maleimide, a vinyl aromatic compound, and maleic anhydride; and metal particles.

14 Claims, No Drawings

THERMOPLASTIC RESIN COMPOSITION FOR HIGH-BRIGHTNESS UNPAINTED METALLIC MATERIAL AND A MOLDED ARTICLE INCLUDING THE SAME

CROSS-REFERENCE TO RELATED APPLICATION

This application claims under 35 U.S.C. § 119(a) the benefit of priority to Korean Patent Application No. 10-2021-0133589 filed on Oct. 8, 2021, the entire contents of which are incorporated herein by reference.

TECHNICAL FIELD

The present invention relates to a thermoplastic resin composition and a molded article including the same, and more particularly, to a thermoplastic resin composition for a high-brightness unpainted metallic material that has an excellent impact strength, chemical resistance, and heat resistance and exhibits an excellent metallic texture, and a molded article including the same.

BACKGROUND

Recently, plastic interior and exterior products having various colors have become popular in electric components, electronic components, and vehicle components, and a demand for a metallic material exhibiting a high grade of a metallic texture has increased.

A plastic resin molded article may be mainly painted with a paint including metal particles to exhibit a metallic texture on an appearance of a plastic interior and exterior product.

However, when the plastic resin molded articles are used as the interior and exterior products, manufacturing costs may be increased due to masking, defects, and difficulties in handling in a post-processing process such as painting performed to exhibit a metallic texture, and a volatile organic compound is used, which is harmful to the human body and the environment.

Therefore, as one of the methods for exhibiting a metallic texture on an appearance of an unpainted product, a method of producing a molded article by adding metal particles to a plastic resin has been reported to increase the affinity between the base resin and the metal particle and thus to prevent appearance quality problems such as a flow mark and a weld line. However, the molded article obtained by such a method is limited in application to a product appearance without painting due to insufficient impact resistance and chemical resistance. In addition, the molded article obtained by such a method is not capable of functioning as an unpainted product for a component requiring high heat resistance such as a vehicle interior material because it has an insufficient heat resistance.

In addition, in order to overcome these limitations, a method of double-injecting or extruding a metallic layer on a molded article has been proposed. However, such a method has upsides such as being capable of realizing a metallic texture and not requiring high mechanical properties, but also has downsides such as increasing processing costs due to double processing and a pretreatment thereof and significantly reducing freedom of design.

Therefore, under the above background, a development of a thermoplastic resin having an excellent metallic texture and brightness characteristics and excellent impact resistance, chemical resistance, and heat resistance has been required.

SUMMARY

In preferred aspects, provide are a thermoplastic resin composition for a high-brightness unpainted metallic material that has an excellent metallic texture with a high brightness and exhibits excellent impact resistance, chemical resistance, and heat resistance, and a molded article including the same.

An object of the present invention is not limited to the above-mentioned objects. An object of the present invention will become more apparent from the following description and will be implemented by the means described in the claims and a combination thereof.

In an aspect, provided is a thermoplastic resin composition including: a polycarbonate resin; a first copolymer including polysiloxane and polycarbonate; a polyester resin; a second copolymer having a core-shell structure and including, as a core, one or more rubber polymers selected from the group consisting of a diene-based rubber polymer, an acrylic rubber polymer, and a silicone-based rubber polymer; a heat resistant component including one or more selected from the group consisting of N-phenylmaleimide, a vinyl aromatic compound, and maleic anhydride; and metal particles.

The thermoplastic resin composition may include, based on the total weight of the thermoplastic resin composition, an amount of about 15 to 70 wt % of the polycarbonate resin, an amount of about 5 to 35 wt % of the first copolymer polysiloxane and polycarbonate, an amount of about 6 to 35 wt % of the polyester resin, an amount of about 3 to 12 wt % of the second copolymer having a core-shell structure, an amount of about 3 to 18 wt % of the heat resistant component, and an amount of about 0.5 to 8 wt % of the metal particles.

The polycarbonate resin may have a viscosity average molecular weight (Mv) of about 15,000 to 40,000 g/mol when measured in a methylene chloride solution at a temperature of 25° C.

The first copolymer including polysiloxane and polycarbonate copolymer may have a viscosity average molecular weight (Mv) of about 15,000 to 200,000 g/mol when measured in a methylene chloride solution at a temperature of about 25° C.

The polyester resin may include an aromatic resin obtained by condensation polymerization of (i) terephthalic acid or terephthalic acid alkyl ester and (ii) a glycol component having 2 to 10 carbon atoms.

The polyester resin may include one or more selected from the group consisting of a polyethylene terephthalate resin, a polytrimethylene terephthalate resin, a polybutylene terephthalate resin, a polyhexamethylene terephthalate resin, a polycyclohexane dimethylene terephthalate resin, and an amorphous polyethylene terephthalate resin.

The polyester resin may have an intrinsic viscosity [η] of about 0.85 to 1.52 dl/g.

The second copolymer having a core-shell structure may be formed by grafting of one or more selected from the group consisting of methacrylic acid alkyl ester, methacrylic acid ester, maleic anhydride, alkyl, and phenyl N-substituted maleimide onto the rubber polymer.

The heat resistant component may contain, based on the total weight of the thermoplastic resin composition, an amount of about 45 to 65 wt % of the N-phenylmaleimide, an amount of about 30 to 50 wt % of the vinyl aromatic compound, and an amount of about 0.5 to 5 wt % of the maleic anhydride.

The heat resistant component may have a glass transition temperature of about 194 to 210° C., a weight average molecular weight (Mw) of about 100,000 to 150,000 g/mol, and a melt flow index (260° C./10 kg) of about 2.4 to 4.4 g/10 min.

The metal particles may be plate-shaped particles having an average particle size of about 5 to 100 μm.

The "particle size" as used herein is measured by maximum diameter of the particle.

The metal particle may include one or more selected from the group consisting of aluminum, gold, silver, platinum, palladium, titanium, iron, chromium, tin, zinc, magnesium, zirconium, cerium, and lithium.

The thermoplastic resin composition may further include an additive, wherein the additive may include, for example, one or more selected from the group consisting of a flame retardant, an antioxidant, a lubricant, a releasing agent, a nucleating agent, a dispersant, an antistatic agent, an ultraviolet (UV) stabilizer, a pigment, and a dye.

In an aspect, provided is a molded article formed of the thermoplastic resin composition as described herein.

Also provided is a vehicle including the molded article as described herein.

The thermoplastic resin composition according to various exemplary embodiments of the present invention may suitably include the polycarbonate resin, the polysiloxane-polycarbonate copolymer, the polyester resin, the second copolymer having a core-shell structure, the heat resistant component, and the metal particles, such that a metallic texture with a high brightness may be maintained, and impact resistance, chemical resistance, and heat resistance may be improved.

In addition, the molded article according to various exemplary embodiments of the present invention has an excellent metallic texture and excellent impact resistance, chemical resistance, and heat resistance due to an increase in distribution of the metal particles on a surface of an injection molded article during injection molding, such that the molded article may be efficiently applied to vehicle interior and exterior components and electrical and electronic components requiring mechanical properties and an unpainted metallic texture.

Other aspects are disclosed infra.

The effects of the present invention are not limited to the above-described effects. It should be understood that the effects of the present invention include all effects that may be inferred from the following description.

DETAILED DESCRIPTION

The above objects, other objects, features, and advantages of the present invention will be easily understood through the following preferred exemplary embodiments related to the accompanying drawings. However, the present invention is not limited to exemplary embodiments described herein and may also be embodied in other forms. On the contrary, exemplary embodiments introduced herein are provided to make disclosed contents thorough and complete and sufficiently transfer the spirit of the present invention to those skilled in the art.

It should be understood that terms "comprise", "have", and the like, as used herein, specify the presence of features, numbers, steps, operations, components, parts described herein, or combinations thereof, but do not preclude the presence or addition of one or more other features, numbers, steps, operations, components, parts, or combinations thereof.

It should be understood that, unless otherwise specified, all numbers, values, and/or expressions expressing ingredients, reaction conditions, polymer compositions, and quantities of formulations used herein, are approximations essentially reflecting various uncertainties of the measurement that these numbers result from obtaining these values, among other things, and are therefore modified by the term "about" in all cases. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed herein, such ranges are continuous and include all values from a minimum value to a maximum value inclusive of the maximum value of such ranges, unless otherwise indicated. Furthermore, when such ranges refer to an integer, all integers from the minimum value to the maximum value inclusive of the maximum value are included, unless otherwise indicated.

It should be understood that when the range is referred to regarding a parameter herein, the parameter encompasses all values included in the ranges including the described end points. For example, the range of "5 to 10" is to be understood to include not only values 5, 6, 7, 8, 9, and 10 but also any sub-ranges of 6 to 10, 7 to 10, 6 to 9, 7 to 9, and the like and any values between appropriate integers in ranges of 5.5, 6.5, 7.5, 5.5 to 8.5, 6.5 to 9, and the like. In addition, for example, the range of "10% to 30%" is to be understood to include not only all integers that include values such as 10%, 11%, 12%, and 13%, as well as 30%, but also any sub-ranges of such as 10% to 15%, 12% to 18%, and 20% to 30%, and any values between appropriate integers that fall within the range, such as 10.5%, 15.5%, and 25.5%.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In an aspect, provided is a thermoplastic resin composition including: a polycarbonate resin; a first copolymer including polysiloxane and polycarbonate; a polyester resin; a second copolymer having a core-shell structure and including, as a core, one or more rubber polymers selected from the group consisting of a diene-based rubber polymer, an acrylic rubber polymer, and a silicone-based rubber polymer; a heat resistant component including one or more selected from the group consisting of N-phenylmaleimide, a vinyl aromatic compound, and maleic anhydride; and metal particles.

The thermoplastic resin composition may suitably include, based on the total weight of the thermoplastic resin composition, an amount of about 15 to 70 wt % of the polycarbonate resin, an amount of about 5 to 35 wt % of the first copolymer including polysiloxane and polycarbonate, an amount of about 6 to 35 wt % of the polyester resin, an amount of about 3 to 12 wt % of the second copolymer having a core-shell structure, an amount of about 3 to 18 wt % of the heat resistant component, and an amount of about 0.5 to 8 wt % of the metal particles.

The respective components constituting the thermoplastic resin composition according to the present invention will be described in more detail as follows.

(A) Polycarbonate Resin

The thermoplastic resin composition suitably may include an amount of about 15 to 70 wt % of the polycarbonate resin based on the total weight of the thermoplastic resin composition. Preferably, the polycarbonate resin may be included in an amount of about 20 wt % or greater, about 25 wt % or greater, about 30 wt % or greater, or about 35 wt % or greater and may be included in an amount of about 65 wt % or less, about 62 wt % or less, or about 60 wt % or less. Particularly, the polycarbonate resin may be included in an amount of about 35 to 65 wt %. When the content of the polycarbonate resin is less than about 15 wt %, the effect of improving physical properties such as chemical resistance and an impact strength may be insignificant. On the contrary, when the content of the polycarbonate resin is greater than about 70 wt %, heat resistance, fluidity, and stiffness properties such as a tensile strength and flexural strength may deteriorate.

The polycarbonate resin may suitably have a viscosity average molecular weight (Mv) of about 15,000 to 40,000 g/mol when measured in a methylene chloride solution at a temperature of 25° C. Preferably, the polycarbonate resin has a viscosity average molecular weight of about 17,000 to 30,000 g/mol. When the viscosity average molecular weight of the polycarbonate resin is less than about 15,000 g/mol, mechanical properties such as an impact strength and a tensile strength may deteriorate, and when the viscosity average molecular weight of the polycarbonate resin is greater than about 40,000 g/mol, problems in the processing of the resin may occur due to an increase in melt viscosity. In particular, the viscosity average molecular weight of the polycarbonate resin may be about 19,000 g/mol or greater in terms of excellent mechanical properties such as an impact strength and a tensile strength, or may be about 30,000 g/mol or less in terms of processability.

The polycarbonate resin may suitably include one or more aromatic monomers and may be prepared by using dihydric phenol, a carbonate precursor, and a chain transfer agent.

The dihydric phenol may include a monomer of a polycarbonate resin having a structure of the following Chemical Formula 1:

[Chemical Formula 1]

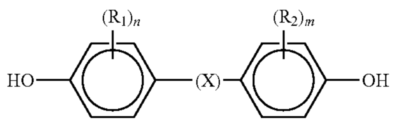

wherein X represents an alkylene group, a linear, branched, or cyclic alkylene group having no functional group, or a linear, branched, or cyclic alkylene group having one or more functional groups selected from the group consisting of sulfide, ether, sulfoxide, sulfone, ketone, naphthyl, and isobutylphenyl, $R_1$ and $R_2$ are each independently a hydrogen atom, a halogen atom, or an alkyl group, and n and m are each independently an integer of 0 to 4.

The dihydric phenol may suitably include bis(4-hydroxyphenyl)methane, bis(4-hydroxyphenyl)phenylmethane, bis(4-hydroxyphenyl)naphthylmethane, bis(4-hydroxyphenyl)-(4-isobutylphenyl)methane, 1,1-bis(4-hydroxyphenyl)ethane, 1-ethyl-1,1-bis(4-hydroxyphenyl)propane, 1-phenyl-1,1-bis(4-hydroxyphenyl)ethane, 1-naphthyl-1,1-bis(4-hydroxyphenyl)ethane, 1,2-bis(4-hydroxyphenyl)ethane, 1,10-bis(4-hydroxyphenyl)decane, 2-methyl-1,1-bis(4-hydroxyphenyl)propane, and 2,2-bis(4-hydroxyphenyl)propane (bisphenol A).

The carbonate precursor may be an exemplary monomer of the polycarbonate resin, and phosgene (carbonyl chloride) may be preferably used as the carbonate precursor. Particularly, the carbonate precursor may include carbonyl bromide, bishaloformate, diphenyl carbonate, and dimethyl carbonate.

As the chain transfer agent, a monofunctional compound similar to a monomer used in preparation of a thermoplastic aromatic polycarbonate resin may be used. Particularly, derivatives based on phenol (for example, p-isopropylphenol, p-tert-butylphenol, p-cumylphenol, p-isooctylphenol, p-isononylphenol, and the like) may be suitably used, and in addition to that, various types of materials such as aliphatic alcohols may be used. Preferably, chain transfer agent may suitably include p-tert-butylphenol (PTBP).

(B) Polysiloxane-Polycarbonate Copolymer (First Copolymer)

The thermoplastic resin composition may suitably include an amount of 5 to 35 wt % of about the first copolymer that is formed with polysiloxane and polycarbonate based on the total weight of the thermoplastic resin composition. Preferably, the first copolymer may be included in an amount of about 5 wt % or greater, about 7 wt % or greater, about 9 wt % or greater, about 10 wt % or greater, about 12 wt % or greater, about 13 wt % or greater, about 14 wt % or greater, or about 15 wt % or greater, and may be contained in an amount of about 35 wt % or less, about 33 wt % or less, about 31 wt % or less, about 30 wt % or less, about 28 wt % or less, about 26 wt % or less, about 24 wt % or less, about 22 wt % or less, or about 20 wt % or less. The first copolymer may be include in an amount of about 10 to 30 wt %, about 15 to 30 wt %, about 15 to 25 wt %, about 10 to 20 wt %, about 10 to 25 wt %, or about 10 to 15 wt %. When the content of the polysiloxane-polycarbonate copolymer is less than about 5 wt %, the effect of improving physical properties such as chemical resistance and an impact strength may be insignificant. On the contrary, when the content of the polysiloxane-polycarbonate copolymer is greater than about 35 wt %, heat resistance, fluidity, and stiffness properties such as a tensile strength and flexural strength may deteriorate.

The first copolymer may have a viscosity average molecular weight (Mv) of 15,000 to 200,000 g/mol when measured in a methylene chloride solution at 25° C. Preferably, the viscosity average molecular weight of the first copolymer may be 15,000 to 70,000 g/mol. In this case, when the viscosity average molecular weight of the first copolymer is less than 15,000 g/mol, mechanical properties of a molded article may significantly deteriorate, and when the viscosity average molecular weight of the first copolymer is more than 200,000 g/mol, problems in the processing of the resin may occur due to an increase in melt viscosity.

The first copolymer may be a copolymer containing hydroxy-terminated siloxane and polycarbonate.

In the first copolymer, the hydroxy-terminated siloxane and the polycarbonate may be contained at a weight ratio of about 50:50 to 99:1. In this case, when a relative content of the hydroxy-terminated siloxane part is less than the above weight ratio, flame retardancy and a low-temperature impact strength may deteriorate. On the contrary, when the relative content of the hydroxy-terminated siloxane part is greater than the above weight ratio, physical properties such as transparency, fluidity, heat resistance, and a room temperature impact strength may deteriorate, and manufacturing costs may be increased due to a decrease in relative content of the polycarbonate part.

The first copolymer may contain hydroxy-terminated polysiloxane represented by the following Chemical Formula 2 and polycarbonate represented by the following Chemical Formula 3 as repeating units:

[Chemical Formula 2]

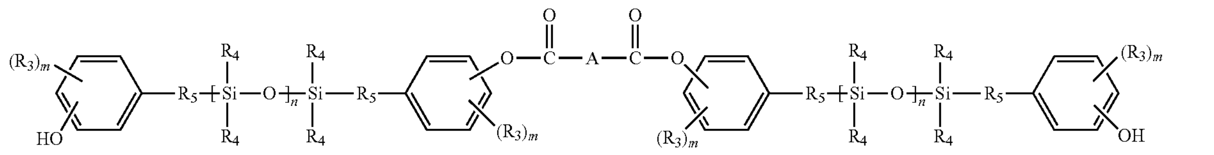

wherein $R_3$'s independently represent a hydrogen atom, a halogen atom, a hydroxy group, an alkyl group having 1 to 20 carbon atoms, an alkoxy group having 1 to 13 carbon atoms, or an aryl group having 6 to 10 carbon atoms, $R_4$'s independently represent a hydrocarbon group having 1 to 13 carbon atoms or a hydroxy group, $R_5$'s independently represent an alkylene group having 2 to 8 carbon atoms, A is X or NH—X—NH, where X represents a linear or branched aliphatic group having 1 to 20 carbon atoms, a cycloalkylene group having 3 to 6 carbon atoms, a halogen atom, an alkyl group, an alkoxy group, an aryl group, or a mononuclear or polynuclear arylene group substituted or unsubstituted with a carboxyl group and having 6 to 30 carbon atoms, m's are independently an integer of 0 to 10, and n's are independently an integer of 2 to 1,000,

[Chemical Formula 3]

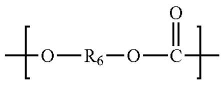

wherein $R_6$ represents an alkyl group having 1 to 20 carbon atoms, a cycloalkyl group having 3 to 6 carbon atoms, an alkenyl group having 2 to 13 carbon atoms, an alkoxy group having 1 to 13 carbon atoms, a halogen atom, or an aromatic hydrocarbon group substituted or unsubstituted with nitro and having 6 to 30 carbon atoms.

(C) Polyester Resin

The thermoplastic resin composition may suitably include the polyester resin in an amount of about 6 to 35 wt % based on the total weight of the thermoplastic resin composition. Preferably, the polyester resin may be included in an amount of about 8 wt % or greater, about 10 wt % or greater, about 12 wt % or greater, about 14 wt % or greater, or about 15 wt % or greater, and may be included in an amount of about 33 wt % or less, about 31 wt % or less, about 29 wt % or less, about 27 wt % or less, or about 25 wt % or less. Preferably, the polyester resin may be suitably included in an amount of 15 to 25 wt %. In this case, when the content of the polyester resin is less than about 5 wt %, the effect of improving chemical resistance may be insignificant. On the contrary, when the content of the polyester resin is greater than about 35 wt %, impact resistance and heat resistance may deteriorate.

The polyester resin may suitably include an aromatic polyester resin, and may include an aromatic resin obtained by polycondensation of terephthalic acid or terephthalic acid alkyl ester and a glycol component having 2 to 10 carbon atoms. Preferably, the number of carbon atoms of the alkyl may be 1 to 10.

The polyester resin may include one or more selected from the group consisting of a polyethylene terephthalate resin, a polytrimethylene terephthalate resin, a polybutylene terephthalate resin, a polyhexamethylene terephthalate resin, a polycyclohexane dimethylene terephthalate resin, and an amorphous polyethylene terephthalate resin.

The polyester resin may have an intrinsic viscosity [η] of about 0.85 to 1.52 dl/g. Preferably, the intrinsic viscosity [η] of the polyester resin may be about 1.03 to 1.22 dl/g. When the intrinsic viscosity [η] of the polyester resin is within the above range, excellent mechanical properties and moldability may be secured.

In particular, polybutylene terephthalate may be used for the polyester resin. Here, polybutylene terephthalate may include a polymer obtained by polycondensation of 1,4-butanediol and terephthalic acid or dimethyl terephthalate as monomers through direct esterification or transesterification.

In order to increase an impact strength of the resin, the polybutylene terephthalate may be copolymerized with polytetramethylene glycol (PTMG), polyethylene glycol (PEG), polypropylene glycol (PPG), low molecular weight aliphatic polyester, or aliphatic polyamide, or may be used in the form of modified polybutylene terephthalate blended with an impact improving component.

(D) Copolymer Having Core-Shell Structure (Second Copolymer)

The thermoplastic resin composition may include the copolymer having a core-shell structure (second copolymer) in an amount of about 3 to 12 wt % based on the total weight of the thermoplastic resin composition. Preferably, the copolymer having a core-shell structure may be contained in an amount of about 4 wt % or greater, about 5 wt % or greater, or about 6 wt % or greater, and may be contained in an amount of about 11 wt % or less, about 10 wt % or less, about 9 wt % or less, about 8 wt % or less, or about 7 wt % or less. Preferably, the second copolymer having a core-shell structure may be contained in an amount of about 4 to 10 wt %, about 4 to 8 wt %, about 4 to 6 wt %, about 6 to 8 wt %, about 6 to 15 wt %, about 6 to 12 wt %, or about 6 to 10 wt %. When the content of the second copolymer having a core-shell structure is less than the above range, it is difficult to implement excellent unpainted impact properties because the effect of impact reinforcement is insignificant, and when the content of the second copolymer having a core-shell structure is greater than the above range, thermal stability may deteriorate, and appearance quality may deteriorate due to gas.

The second copolymer having a core-shell structure may have, as a core, one or more rubber polymers selected from the group consisting of a diene-based rubber polymer, an acrylic rubber polymer, and a silicone-based rubber polymer.

In this case, the rubber polymer may be suitably obtained by polymerizing (e.g., condensation polymerization) one or more monomers selected from the group consisting of diene-based rubber, acrylate-based rubber, and silicone-based rubber having 4 to 6 carbon atoms.

The second copolymer having a core-shell structure may be formed by grafting of one or more selected from the group consisting of C1-C8 methacrylic acid alkyl ester, C1-C8 methacrylic acid ester, maleic anhydride, C1-C4 alkyl, and phenyl N-substituted maleimide onto the rubber polymer.

The methacrylic acid alkyl ester or methacrylic acid ester may be a monohydric alcohol having 1 to 8 carbon atoms. Particular, examples thereof may include methacrylic acid methyl ester, methacrylic acid ethyl ester, and methacrylic acid propyl ester.

The rubber polymer may be included in the copolymer having a core-shell structure in an amount of about 4 to 10 parts by weight based on the total weight of the copolymer.

When a silicone-based rubber polymer or a mixture of a silicone-based rubber polymer and an acrylate-based rubber polymer may be suitably used for the copolymer having a core-shell structure, structural stability may be obtained. Therefore, chemical resistance and thermal stability may be improved.

An acrylate monomer such as methyl acrylate, ethyl acrylate, n-propyl acrylate, n-butyl acrylate, 2-ethylhexyl acrylate, hexyl methacrylate, or 2-ethylhexyl methacrylate may be suitably used for the acrylate-based rubber polymer. As a curing agent, ethylene glycol dimethacrylate, propylene glycol dimethacrylate, 1,3-butylene glycol dimethacrylate, 1,4-butylene glycol dimethacrylate, allyl methacrylate, triallyl cyanurate, or the like may be preferably used.

The silicone-based rubber polymer may be produced using cyclosiloxane, and particularly, may be produced using one or more selected from the group consisting of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. In this case, trimethoxymethylsilane, triethoxyphenylsilane, tetramethoxysilane, tetraethoxysilane, or the like may be suitably used as the curing agent.

(E) Heat Resistant Component

The thermoplastic resin composition may include the heat resistant component in an amount of about 3 to 18 wt % based on the total weight of the thermoplastic resin composition. Preferably, the heat resistant component may be suitably included in an amount of about 4 wt % or greater, about 5 wt % or greater, or about 6 wt % or greater, and may be contained in an amount of about 17 wt % or less, about 15 wt % or less, about 13 wt % or less, about 11 wt % or less, about 10 wt % or less, about 9 wt % or less, about 8 wt % or less, or about 7 wt % or less. Preferably, the heat resistant component may be included in an amount of about 4 to 10 wt %, about 4 to 8 wt %, about 4 to 6 wt %, about 5 to 10 wt %, about 5 to 8 wt %, about 6 to 10 wt %, or about 6 to 8 wt %. When the content of the heat resistant component is less than about 3 wt %, the effect of improving heat resistance may be insignificant. On the contrary, when the content of the heat resistant component is greater than about 18 wt %, an impact strength may deteriorate.

The heat resistant component may contain at least one selected from the group consisting of N-phenylmaleimide, a vinyl aromatic compound, maleic anhydride, and a combination thereof.

The heat resistant component may suitably include, based on the total weight thereof, about 45 to 65 wt % of the N-phenylmaleimide, about 30 to 50 wt % of the vinyl aromatic compound, and about 0.5 to 5 wt % of the maleic anhydride.

The heat resistant component may have a glass transition temperature of about 194 to 210° C., a weight average molecular weight (Mw) of about 100,000 to 150,000 g/mol, and a melt flow index (MFI) (260° C./10 kg) of about 2.4 to 4.4 g/10 min.

Particularly, the heat resistant component may be an N-phenylmaleimide compound-vinyl aromatic compound-maleic anhydride copolymer.

(F) Metal Particle

The thermoplastic resin composition may suitably include metal particles to impart a metallic texture. The metal particles may be contained in the thermoplastic resin composition in an amount of about 0.5 to 8 wt % based on the total weight of the thermoplastic resin composition. Preferably, the metal particles may be included in an amount of about 0.7 wt % or greater, about 0.8 wt % or greater, about 0.9 wt % or greater, about 1 wt % or greater, about 1.2 wt % or greater, about 1.4 wt % or greater, about 1.6 wt % or greater, about 1.8 wt % or greater, about 2 wt % or greater, about 2.2 wt % or greater, about 2.4 wt % or greater, about 2.6 wt % or greater, about 2.8 wt % or greater, or about 3 wt % or greater, and may be contained in an amount of about 7 wt % or less, about 6.5 wt % or less, about 6.2 wt % or less, about 6 wt % or less, about 5.6 wt % or less, about 5.2 wt % or less, about 5 wt % or less, about 4.8 wt % or less, about 4.6 wt % or less, about 4.4 wt % or less, about 4.2 wt % or less, or about 4 wt % or less. Preferably, the metal particles may be contained in an amount of about 1 to 6 wt %, about 1 to 5 wt %, about 1 to 4 wt %, about 1 to 3 wt %, about 2 to 6 wt %, about 2 to 4 wt %, or about 3 to 6 wt %. When the content of the metal particles is less than about 0.5 wt %, the effect of imparting a metallic texture may be insignificant, and when the content of the metal particles is greater than about 8 wt %, decomposition of the thermoplastic resin may occur, resulting in an increase in amount of gas generated. Therefore, mechanical properties and molding processability may deteriorate, and appearance characteristics may deteriorate due to a weld line or the like.

The type of metal particle is not limited, and a material of the metal particle to be used may be selected according to a desired metallic appearance required in a molded article to which the thermoplastic resin composition of the present invention is applied.

The metal particle may include one or more selected from the group consisting of aluminum, gold, silver, platinum, palladium, titanium, iron, chromium, tin, zinc, magnesium, zirconium, cerium, and lithium.

The metal particle may be any metal or an alloy of any two or more metals. Preferably, the metal particle may be aluminum or an aluminum-based alloy.

A surface of the metal particle may be coated or treated, and a silica or silane-based coupling agent may be used as a coating or surface treatment agent, but the present invention is not limited thereto.

The type of metal particle is not limited in terms of shape, and a metal particle having a plate shape, an irregular plate shape, or a spherical shape may be contained. One type of metal particles may be contained, and a mixture of two or more types of metal particles may be used. When spherical metal particles are added, a weld line and a flow weld line may be additionally prevented.

Preferably, as the metal particles, irregular plate-shaped metal particles and plate-shaped metal particles may be used alone, respectively, or as a mixture thereof.

The metal particles may have an average particle size of about 5 to 100 μm. Preferably, the average particle size of the metal particles may be about 10 to 60 μm. When the average particle size of the metal particles is less than about 10 μm, a surface area in contact with the thermoplastic resin is increased. Therefore, the thermoplastic resin is easily decomposed, which may increase the amount of gas generated. When the average particle size of the metal particles is greater than about 100 μm, a sparkling effect is increased, and thus, the effect of imparting a metallic texture may be insignificant.

A mixture of two or more types of metal particles having different average particle sizes may be used. Particularly, a mixture of the metal particles may be a mixture of one or more types of metal particles having an average particle size of about 10 μm or less and one or more types of metal particles having an average particle size of about 10 to 100 μm (preferably about 15 to 60 μm). In this case, a content of the metal particles having an average particle size of 10 μm or less may be less about than 3 wt % based on the total weight of the thermoplastic resin composition, and a content of the metal particles having an average particle size of about 10 to 100 μm (preferably about 15 to 60 μm) may be less than 10 wt % based on the total weight of the thermoplastic resin composition of the present invention. A content of the mixture of the metal particles may be about 1 to 6 wt %, preferably about 1.5 to 5 wt %, and more preferably about 2 to 4 wt %, based on the total weight of the thermoplastic resin composition. When the content of the metal particles having an average particle size of about 10 μm or less is about 3 wt % or greater, or the content of the metal particles having an average particle size of about 10 to 100 μm (preferably about 15 to 60 μm) is about 10 wt % or greater, in the mixture of the metal particles, decomposition of the thermoplastic resin may occur, resulting in an increase in amount of gas generated.

(G) Additive

The additive may be a component for imparting various functions to the thermoplastic resin composition. The thermoplastic resin composition may further contain an additive. As the additive, a known additive may be used without limitation as long as it does not impair the effects to the thermoplastic resin.

The additive may include one or more selected from the group consisting of a flame retardant, an antioxidant, a lubricant, a releasing agent, a nucleating agent, a dispersant, an antistatic agent, an ultraviolet (UV) stabilizer, a pigment, and a dye.

A content of the additive is not particularly limited, and may be about 20 parts by weight or less, and for example, about 0.1 to 10 parts by weight, based on the total weight of the thermoplastic resin composition.

In an aspect, provided is a molded article including the thermoplastic resin composition.

The molded article may be obtained by molding a polypropylene composite resin composition (e.g., the thermoplastic resin composition as described herein) by an extrusion molding method, an injection molding method, a compression molding method, a foam injection molding method, a foam low-pressure injection molding method, a gas compression molding method, or the like.

In addition, the field in which the molded article is used is not limited, and the molded article may be preferably applied to a molded article significantly requiring not only heat resistance, impact resistance, and chemical resistance but also appearance quality such as a metallic texture or brightness. For example, the molded article may be used for a vehicle component, a mechanical component, an electrical and electronic component, office equipment such as a computer, miscellaneous goods, and the like. In particular, the molded article may be preferably applied to vehicle interior and exterior products such as a vehicle door handle, a bumper part, a wheel cover, a garnish, a crash pad, a button, a panel, and a lighting housing.

In addition, the molded article according to various exemplary embodiments of the present invention may be applied to a molded article for a vehicle and electrical and electronic use, in particular, an unpainted vehicle interior material because it has an excellent metallic texture and improved mechanical properties such as heat resistance, chemical resistance, and impact resistance without a separate post-treatment process.

EXAMPLE

Hereinafter, the present invention will be described in more detail with reference to specific Examples. The following Examples are only examples provided in order to assist in the understanding of the present invention, but the scope of the present invention is not limited thereto.

Examples and Comparative Examples

A thermoplastic resin composition was prepared with the compositions and contents shown in Tables 1 and 2.

Here, the components of the thermoplastic resin composition used in each of Examples and Comparative Examples are as follows.

(a) Polycarbonate: polycarbonate thermoplastic resin having viscosity average molecular weight of 19,000 (TRIREX 3020PJ, Samyang Corporation)

(b) Polysiloxane-polycarbonate copolymer (first copolymer): polysiloxane-polycarbonate copolymer thermoplastic resin having viscosity average molecular weight of 26,000 (TRIREX ST4-3022PJ)

(c) Polyester: polybutylene terephthalate resin having intrinsic viscosity of 1.1 dl/g (TRILOY 1700S, Samyang Corporation)

(d) Silicone-based copolymer having core-shell structure: silicone-based copolymer having average particle size of 0.1 to 1 μm and formed by grafting of methyl methacrylate monomer onto rubber composed of dimethyl siloxane and butyl acrylate (S-2501, Mitsubishi Rayon Co., Ltd.)

(e) Heat resistant component: MS-CP, Denka Company Limited (f) Metal particles: irregular plate-shaped aluminum particles having average particle size of 15 μm, Eckar GmbH

TABLE 1

| | Classification | Examples 1 | 2 | 3 | 4 | 5 | 6 | 7 | 8 | 9 | 10 | 11 |
|---|---|---|---|---|---|---|---|---|---|---|---|---|
| Composition (wt %) | Polycarbonate | 50 | 55 | 35 | 60 | 40 | 52 | 46 | 53 | 41 | 52 | 47 |
| | Polysiloxane-polycarbonate copolymer (first copolymer) | 15 | 10 | 30 | 15 | 15 | 15 | 15 | 15 | 15 | 15 | 15 |
| | Polyester | 20 | 20 | 20 | 10 | 30 | 20 | 20 | 20 | 20 | 20 | 20 |
| | Copolymer having core-shell structure (second copolymer) | 6 | 6 | 6 | 6 | 6 | 4 | 10 | 6 | 6 | 6 | 6 |
| | Heat resistant component | 6 | 6 | 6 | 6 | 6 | 6 | 6 | 3 | 15 | 6 | 6 |
| | Metal particles | 3 | 3 | 3 | 3 | 3 | 3 | 3 | 3 | 3 | 1 | 6 |

TABLE 2

| | Classification | Comparative Examples 1 | 2 | 3 | 4 | 5 | 6 | 7 | 8 | 9 | 10 |
|---|---|---|---|---|---|---|---|---|---|---|---|
| Composition (wt %) | Polycarbonate | 65 | 25 | 65 | 30 | 54 | 41 | 56 | 36 | 52.7 | 43 |
| | Polysiloxane-polycarbonate copolymer | 0 | 40 | 15 | 15 | 15 | 15 | 15 | 15 | 15 | 15 |
| | Polyester | 20 | 20 | 5 | 40 | 20 | 20 | 20 | 20 | 20 | 20 |
| | Copolymer having core-shell structure | 6 | 6 | 6 | 6 | 2 | 15 | 6 | 6 | 6 | 6 |
| | Heat resistant component | 6 | 6 | 6 | 6 | 6 | 6 | 0 | 20 | 6 | 6 |
| | Metal particles | 3 | 3 | 3 | 3 | 3 | 3 | 3 | 3 | 0.3 | 10 |

Experimental Examples

The properties of the thermoplastic resin composition of each specimen according to each of Examples and Comparative Examples were evaluated by the following method.

Measurement Method

Specimens were prepared using the thermoplastic resin compositions according to Examples 1 to 11 and Comparative Examples 1 to 10 by the following method.

First, the thermoplastic resin composition in which the described components were mixed was uniformly dispersed, and then, the dispersed thermoplastic resin composition was extruded in a twin-screw melt mixing extruder (L/D=48, Φ=25 mm) under conditions of a melting temperature (280° C.), the number of rotations of the screw (300 rpm), a pressure (first vent of about −600 mmHg), and a self-feeding rate (30 kg/h). Subsequently, the extruded strand was cooled in water, and the cooled strand was cut with a rotary cutter, thereby preparing pellets. Next, the prepared pellets were dried with hot air at a temperature of 90 to 100° C. for 4 hours, and then, the dried pellets were injection-molded at 260 to 280° C., thereby preparing a specimen.

Next, the physical properties were measured using the prepared specimen by the following method.

1) Metallic texture: A flop index was measured using BYK-Mac i Spectrophotometer (BYK Additives & Instruments). Particularly, the luminance of the reflected light on the surface of the injection molded specimen prepared in each of Examples and Comparative Examples was measured at angles of 15°, 45°, and 110°, and the flop index was calculated by substituting the value of the luminance into the following Equation 1.

In this case, the value of the flop index is expressed as 0 for a surface of an object having no metallic texture, 15 to 17 for a real metal surface, 12 to 14 for a surface of an injection molded article coated with a paint composition, and 6 or more for a surface of which a metallic texture may be observed with the naked eyes.

$$\text{Flop Index} = \frac{2.69(L^*_{15°} - L^*_{110°})^{1.11}}{(L^*_{45°})^{0.86}}$$ [Equation 1]

wherein L*15° represents luminance of reflected light measured at an angle of 15°, L*45° represents luminance of reflected light measured at an angle of 45°, and L*115° represents luminance of reflected light measured at an angle of 115°.

2) Chemical resistance: A painting material band strip test (7 days) was performed with a tensile specimen based on ASTM D638. The evaluation strength is expressed as 1 to 5, and the criteria are as follows.

(Evaluation criteria) 5: Good, 4: Edge Crack, 3: Center Crack, 2: Deep Crack, 1: Break 3) Heat resistant temperature (heat deflection temperature (HDT)): A heat deflection temperature of an 80 mm×10 mm×4 mm specimen was measured under conditions of a load of 1.8 MPa and a temperature increase rate of 120°

C./hr according to ISO 75. The case where the heat resistant temperature is 85° C. or greater is determined to be good.

4) IZOD impact properties: An impact strength of the injection molded specimen prepared in each of Examples and Comparative Examples was measured according to ISO 180.

5) Melt index (MI): The specimen was dried in a pellet state at a temperature of 90° C. for 4 hours, and then, the amount of flow was measured under conditions of 250° C. and a load of 5 kg for 10 minutes according to ASTM D1238.

6) Tensile strength: A tensile strength of the injection molded specimen prepared in each of Examples and Comparative Examples was measured according to ISO 527.

(3) Results

The evaluation results of the thermoplastic resin compositions according to Examples 1 to 11 and Comparative Examples 1 to 10 are as shown in Tables 3 and 4.

TABLE 3

| Classification | | | Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Physical properties | Special properties | Metallic texture (flop index) | 13.5 | 13.7 | 13.1 | 13.6 | 13.2 | 13.8 | 13 | 13.6 | 13.2 | 12.1 | 14.7 |
| | | Chemical resistance | 5 | 5 | 5 | 4 | 5 | 5 | 5 | 5 | 5 | 5 | 5 |
| | Mechanical properties | Heat resistance (° C.) | 100 | 102 | 97 | 104 | 95 | 101 | 96 | 97 | 106 | 101 | 97 |
| | | Impact strength ($kJ/m^2$) | 27 | 21 | 42 | 31 | 20 | 22 | 35 | 28 | 20 | 30 | 20 |
| | | Melt index (MI) | 16 | 17 | 10 | 11 | 22 | 17 | 12 | 17 | 13 | 18 | 13 |
| | | Tensile strength (MPa) | 54 | 55 | 50 | 55 | 54 | 56 | 50 | 54 | 55 | 54 | 55 |

TABLE 4

| Classification | | | Comparative Examples | | | | | | | | | |
|---|---|---|---|---|---|---|---|---|---|---|---|---|
| | | | 1 | 2 | 3 | 4 | 5 | 6 | 7 | 8 | 9 | 10 |
| Physical properties | Special properties | Metallic texture (flop index) | 13.8 | 12.7 | 13.7 | 13 | 14.1 | 11.8 | 13.8 | 12.9 | 10.5 | 15.3 |
| | | Chemical resistance | 4 | 5 | 3 | 5 | 5 | 5 | 5 | 5 | 5 | 5 |
| | Mechanical properties | Heat resistance (° C.) | 105 | 94 | 106 | 89 | 104 | 91 | 90 | 108 | 100 | 102 |
| | | Impact strength ($kJ/m^2$) | 16 | 50 | 35 | 14 | 11 | 44 | 31 | 15 | 32 | 6 |
| | | Melt index (MI) | 20 | 7 | 9 | 30 | 19 | 8 | 19 | 9 | 18 | 8 |
| | | Tensile strength (MPa) | 56 | 46 | 55 | 53 | 58 | 43 | 55 | 56 | 54 | 56 |

As shown in Table 1, the specimens containing the thermoplastic resin compositions were prepared by adjusting the content of the polysiloxane-polycarbonate copolymer within the range of 5 to 35 wt % in each of Examples 2 and 3, the content of the polyester within the range of 6 to 35 wt % in each of Examples 4 and 5, the content of the copolymer having a core-shell structure within the range of 3 to 12 wt % in each of Examples 6 and 7, the content of the heat resistant component within the range of 3 to 18 wt % in each of Examples 8 and 9, and the content of the metal particles within the range of 0.5 to 8 wt % in each of Examples 10 and 11.

As shown in Table 3, in each of Examples 1 to 11, i) the excellent value of the flop index of 12 or more was obtained in the metallic texture test, ii) the chemical resistance was grade 4 or higher, iii) the high heat resistant temperature of 95 to 106° C. was obtained, iv) the measured impact strength, melt index, and tensile strength were 20 to 42 $kJ/m^2$, 11 to 22 MI, and 50 to 56 MPa, respectively, which showed that the specimen having excellent mechanical properties was implemented. Therefore, the appropriate amounts of the respective components were included in the specimen according to the present invention, such that the quality of the specimen was excellent due to the balance between all the properties.

On the contrary, referring to Tables 2 and 4, in Comparative Example 1 (the polysiloxane-polycarbonate copolymer was not added), the measured impact strength was 20 $kJ/m^2$ or less, which was low.

In Comparative Example 2 (the content of the polysiloxane-polycarbonate copolymer was greater than 35 wt %), the measured melt index and tensile strength were low.

In Comparative Example 3 (the content of the polyester was less than 6 wt %), the chemical resistance was grade 3, which was not preferable.

In Comparative Example 4 (the content of the polyester was greater than 35 wt %), the heat resistant temperature and the impact strength were not preferable.

In Comparative Example 5 (the content of the copolymer having a core-shell structure was less than 3 wt %), the impact strength was not preferable, and in Comparative Example 6 (the content of the copolymer having a core-shell structure was greater than 12 wt %), since the value of the flop index was less than 12, the metallic texture was not preferable, and the measured melt index and tensile strength were low.

In Comparative Example 7 (the heat resistant component was not added), the measured heat resistant temperature was low, and in Comparative Example 8 (the content of the heat resistant component was greater than 18 wt %), the impact strength and the melt index were not preferable.

In Comparative Example 9 (the content of the metal particles was less than 0.5 wt %), since the value of the flop index was less than 11, the metallic texture was not preferable, and in Comparative Example 10 (the content of the metal particles was greater than 8 wt %), the impact strength and the melt index were not preferable.

Therefore, in the case of the specimen according to each of Comparative Examples 1 to 10, the balance between the metallic texture, the chemical resistance, the heat resistant temperature, the impact strength, the melt index, and the tensile strength was not preferable compared to that in each of Examples 1 to 11. Various properties of the final product may significantly deteriorate due to such a balance.

Therefore, the thermoplastic resin composition contains the polycarbonate resin, the polysiloxane-polycarbonate copolymer (first copolymer), the polyester resin, the copolymer having a core-shell structure (second copolymer), the heat resistant component, and the metal particles in appropriate specific amounts, such that a distribution of the metal particles on a surface of an injection molded article is increased during injection molding. As a result, a metallic texture with a high brightness may be maintained, and impact resistance, chemical resistance, and heat resistance may be improved.

Although exemplary embodiments of the present invention have been described hereinabove, those skilled in the art will appreciate that various modifications and alterations may be made without departing from the spirit or essential feature of the present invention. Therefore, it is to be understood that the exemplary embodiments described hereinabove are illustrative rather than being restrictive in all aspects.

What is claimed is:

1. A thermoplastic resin composition comprising:

a polycarbonate resin;

a first copolymer comprising polysiloxane and poly carbonate;

a polyester resin;

a second copolymer having a core-shell structure and comprising, as a core, one or more rubber polymers selected from the group consisting of a diene-based rubber polymer, an acrylic rubber polymer, and a silicone-based rubber polymer;

a heat resistant component comprising one or more selected from the group consisting of N-phenylmaleimide, a vinyl aromatic compound, and maleic anhydride; and metal particles, wherein the metal particles is present in a metallic state, wherein the thermoplastic resin composition comprises, based on a total weight of the thermoplastic resin composition;

an amount of about 15 to 70 wt % of the polycarbonate resin;

an amount of about 5 to 35 wt % of the first copolymer comprising the polysiloxane and the polycarbonate;

an amount of about 6 to 35 wt % of the polyester resin;

an amount of about 3 to 12 wt % of the copolymer having a core-shell structure;

an amount of about 3 to 18 wt % of the heat resistant component; and an amount of about 0.5 to 8 wt % of the metal particles.

2. The thermoplastic resin composition of claim 1, wherein the polycarbonate resin has a viscosity average molecular weight (Mv) of about 15,000 to 40,000 g/mol when measured in a methylene chloride solution at a temperature of 25° C.

3. The thermoplastic resin composition of claim 1, wherein the first copolymer has a viscosity average molecular weight (Mv) of about 15,000 to 200,000 g/mol when measured in a methylene chloride solution at a temperature of 25° C.

4. The thermoplastic resin composition of claim 1, wherein the polyester resin comprises an aromatic resin obtained by condensation polymerization of (i) terephthalic acid or terephthalic acid alkyl ester and (ii) a glycol component having 2 to 10 carbon atoms.

5. The thermoplastic resin composition of claim 1, wherein the polyester resin comprises one or more selected from the group consisting of a polyethylene terephthalate resin, a polytrimethylene terephthalate resin, a polybutylene terephthalate resin, a polyhexamethylene terephthalate resin, a polycyclohexane dimethylene terephthalate resin, and an amorphous polyethylene terephthalate resin.

6. The thermoplastic resin composition of claim 1, wherein the polyester resin has an intrinsic viscosity [η] of about 0.85 to 1.52 dl/g.

7. The thermoplastic resin composition of claim 1, wherein the second copolymer having a core-shell structure is formed by grafting one or more selected from the group consisting of methacrylic acid alkyl ester, methacrylic acid ester, maleic anhydride, alkyl, and phenyl N-substituted maleimide onto the rubber polymer.

8. The thermoplastic resin composition of claim 1, wherein the heat resistant component contains, based on the total weight of the thermoplastic resin composition:

an amount of about 45 to 65 wt % of the N-phenylmaleimide;

an amount of about 30 to 50 wt % of the vinyl aromatic compound; and an amount of about 0.5 to 5 wt % of the maleic anhydride.

9. The thermoplastic resin composition of claim 1, wherein the heat resistant component has a glass transition temperature of about 194 to 210° C., a weight average molecular weight (Mw) of about 100,000 to 150,000 g/mol, and a melt flow index of about 2.4 to 4.4 g/10 min.

10. The thermoplastic resin composition of claim 1, wherein the metal particles are particles having an average particle size of about 5 to 100 μm.

11. The thermoplastic resin composition of claim 1, wherein the metal particle comprises one or more selected from the group consisting of aluminum, gold, silver, platinum, palladium, titanium, iron, chromium, tin, zinc, magnesium, zirconium, cerium, and lithium.

12. The thermoplastic resin composition of claim 1, further comprising an additive, wherein the additive comprises one or more selected from the group consisting of a flame retardant, an antioxidant, a lubricant, a releasing agent, a nucleating agent, a dispersant, an antistatic agent, an ultraviolet (UV) stabilizer, a pigment, and a dye.

13. A molded article comprising a thermoplastic resin composition of claim 1.

14. A vehicle comprising a molded article of claim 13.

* * * * *